Feb. 20, 1968  P. K. DAVIS  3,369,432
PIPE CUTOFF CONTROL APPARATUS
Filed Aug. 16, 1965  7 Sheets-Sheet 4
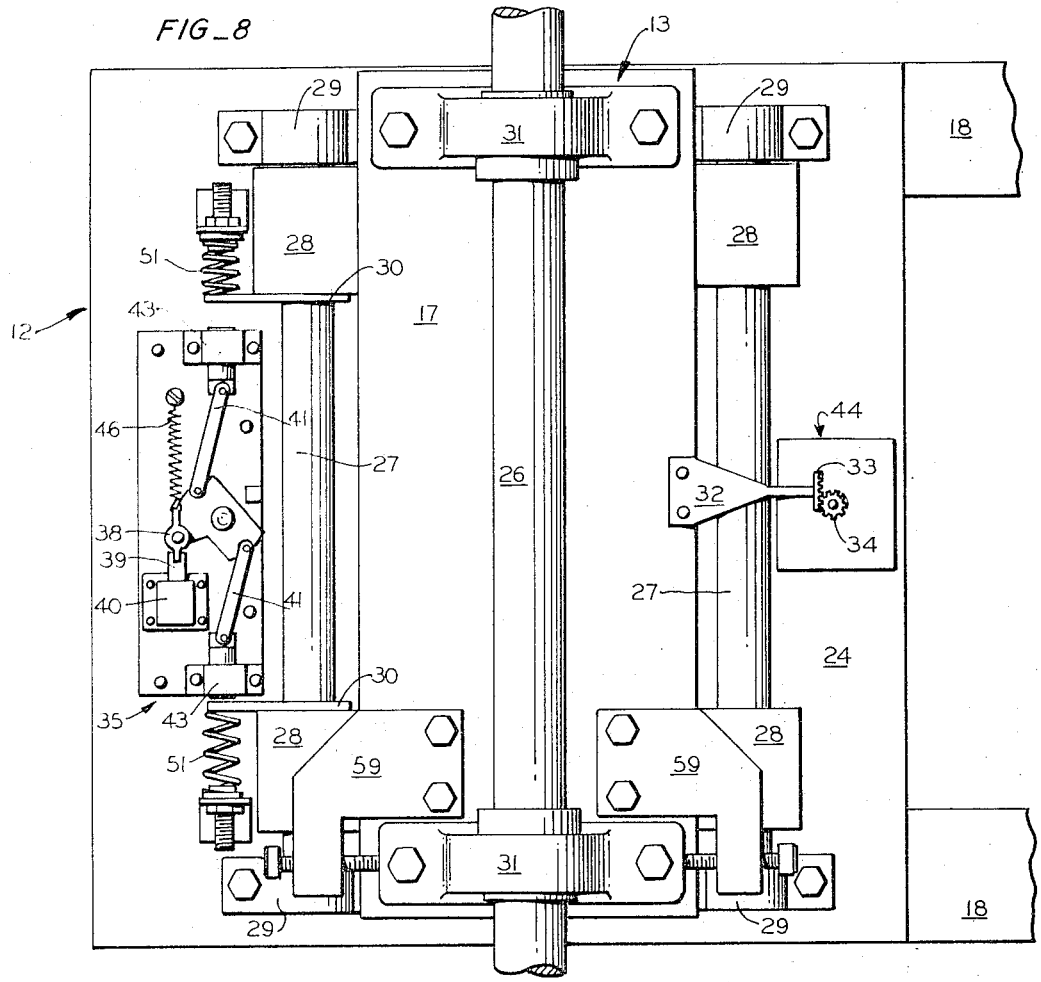
FIG_8
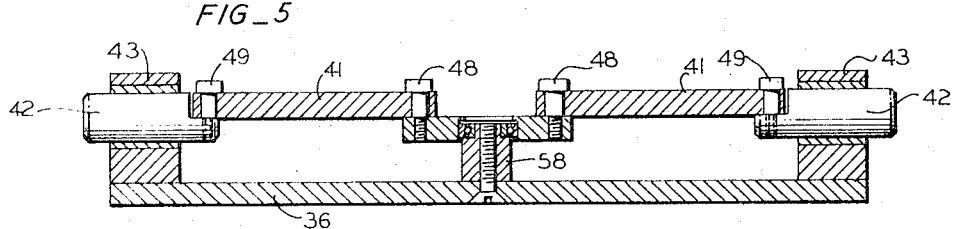
FIG_5
INVENTOR.
PAUL K. DAVIS
BY
Boyken, Mohler & Foster
ATTORNEYS Feb. 20, 1968 P. K. DAVIS 3,369,432
PIPE CUTOFF CONTROL APPARATUS
Filed Aug. 16, 1965 7 Sheets-Sheet 5
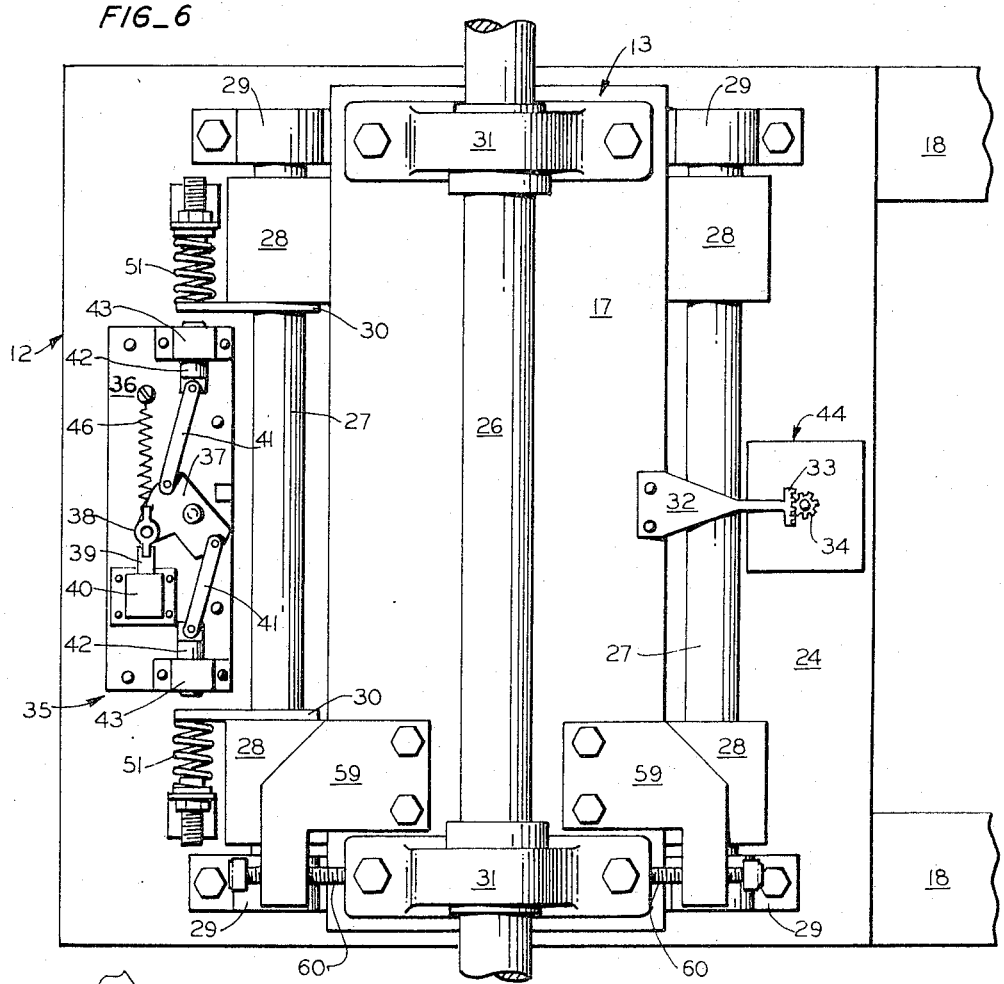
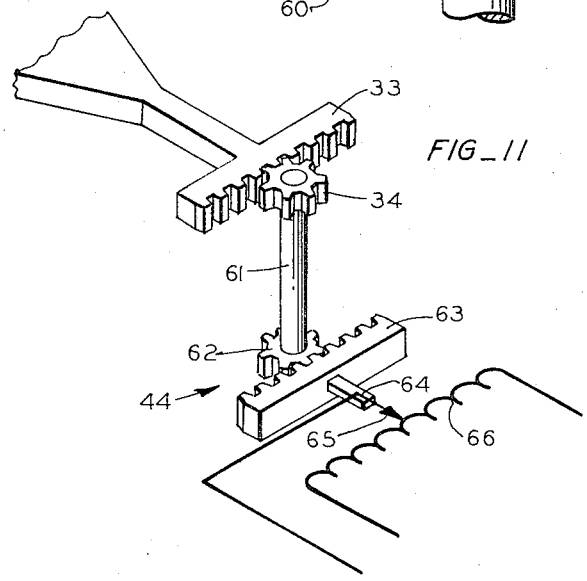
INVENTOR.
PAUL K. DAVIS
BY
Boyken, Mohler & Foster
ATTORNEYS

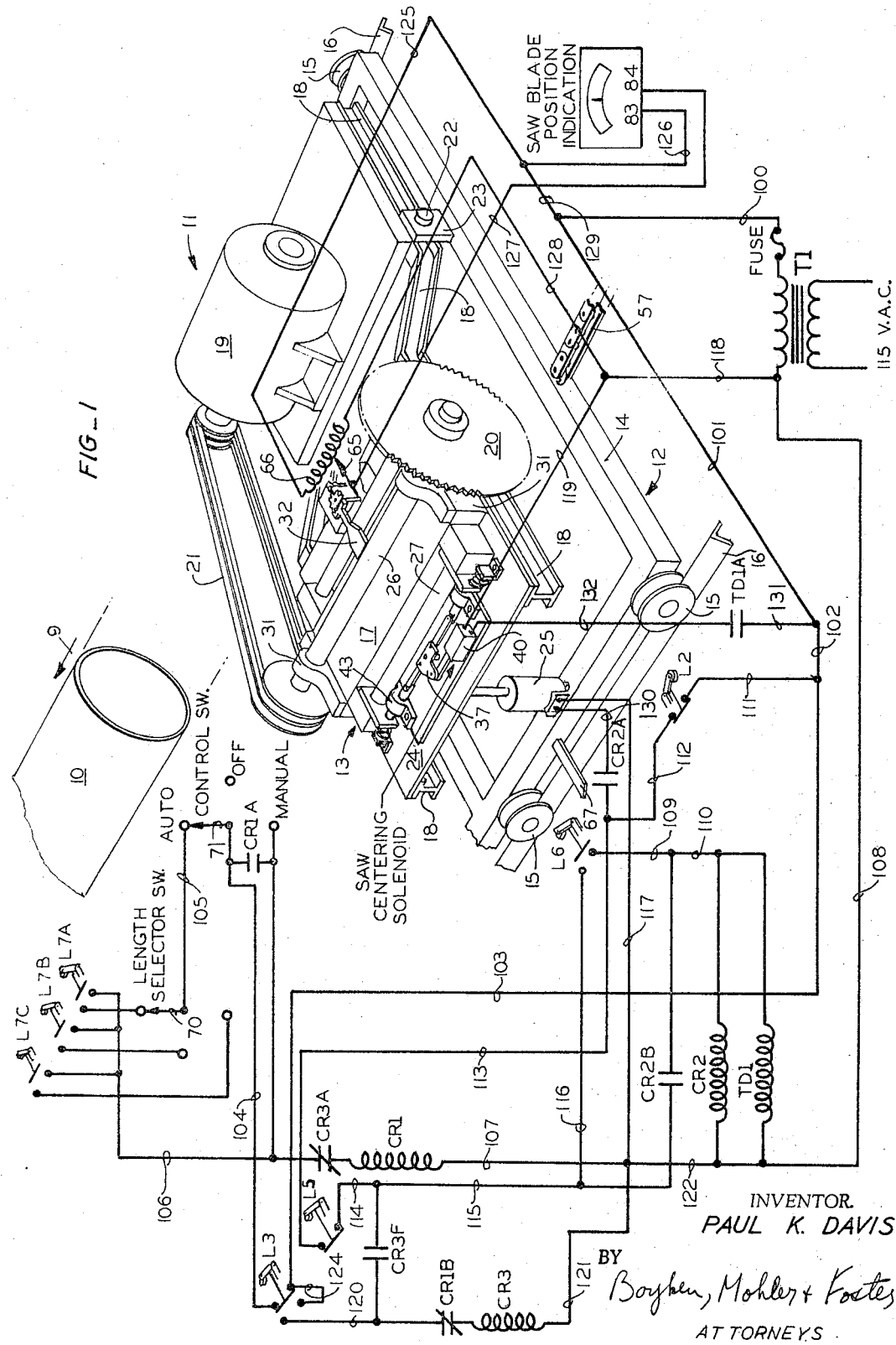

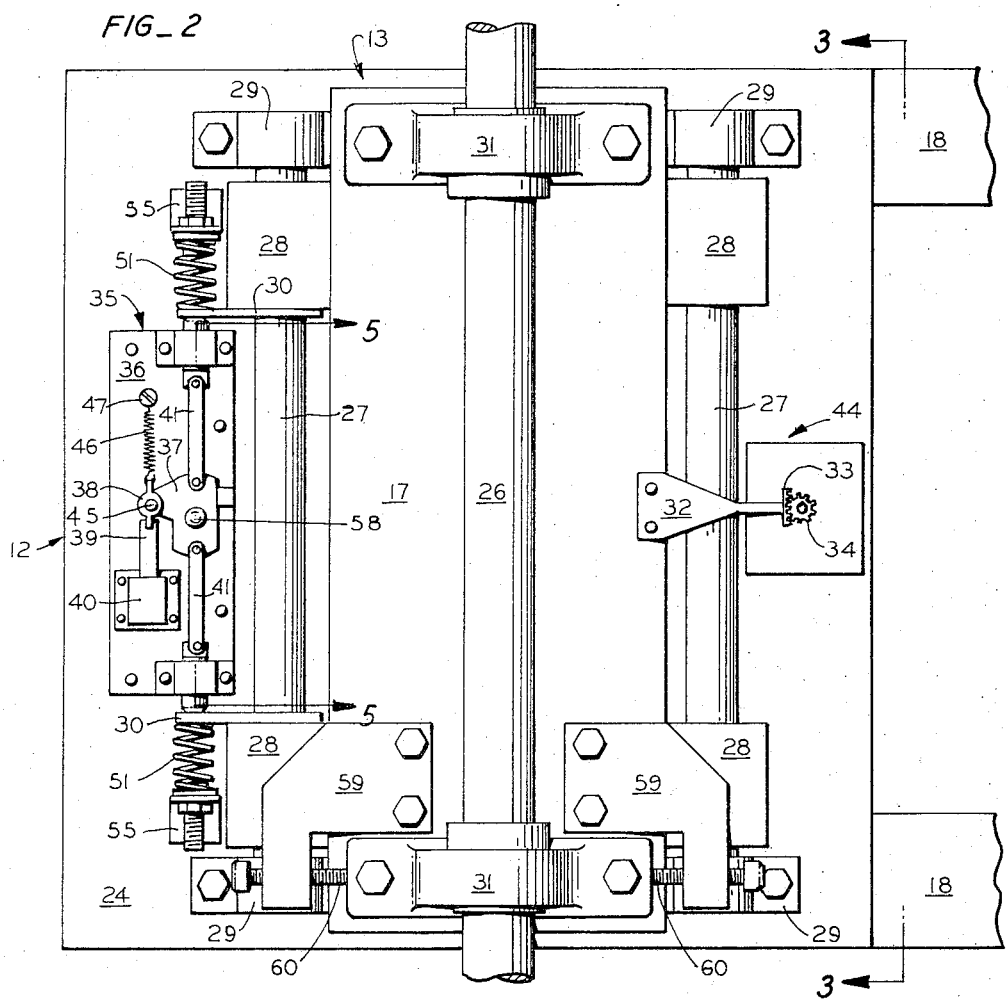
FIG_2
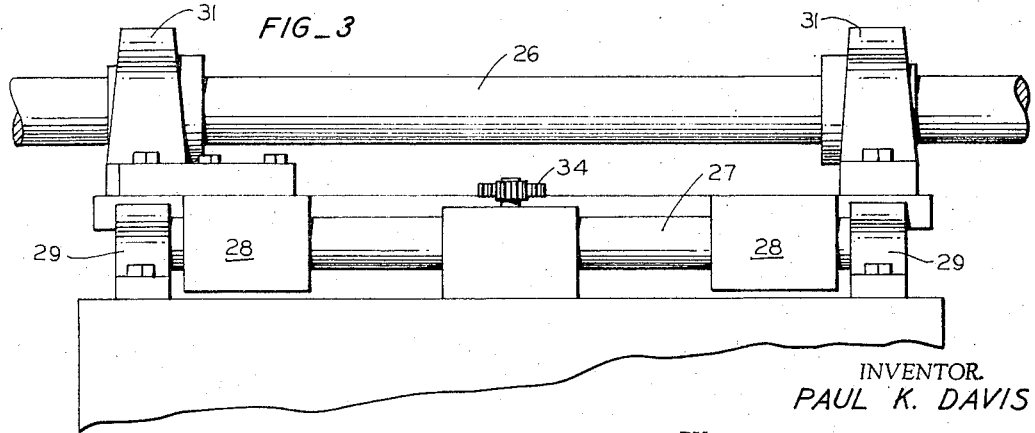
FIG_3
INVENTOR.
PAUL K. DAVIS
BY
Boyken, Mohler & Foster
ATTORNEYS

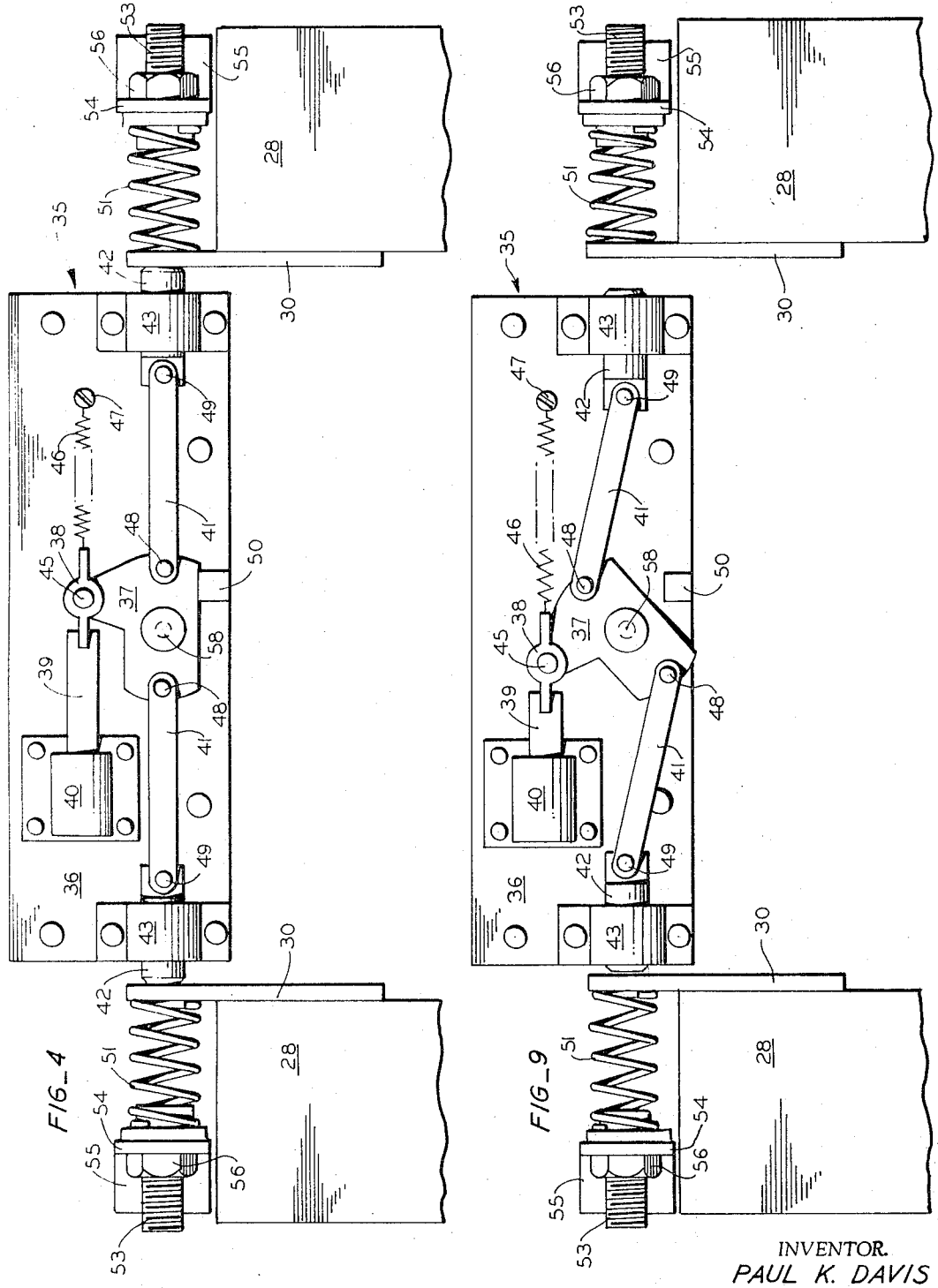

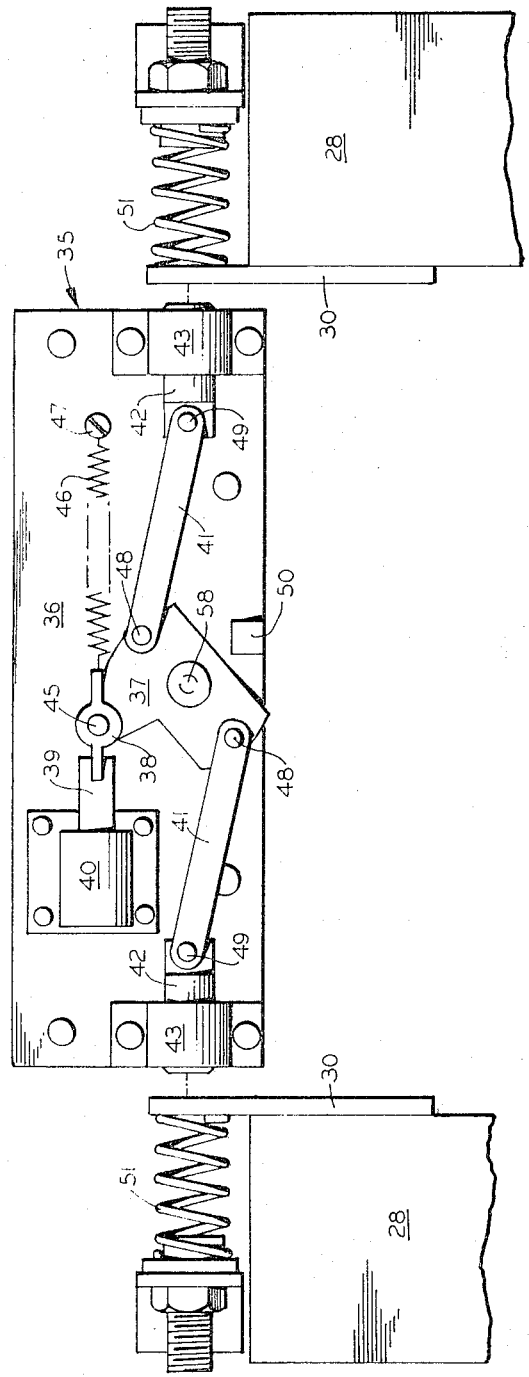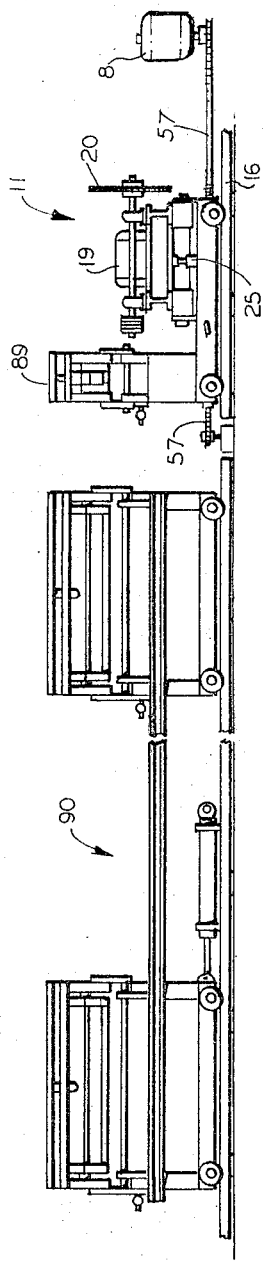

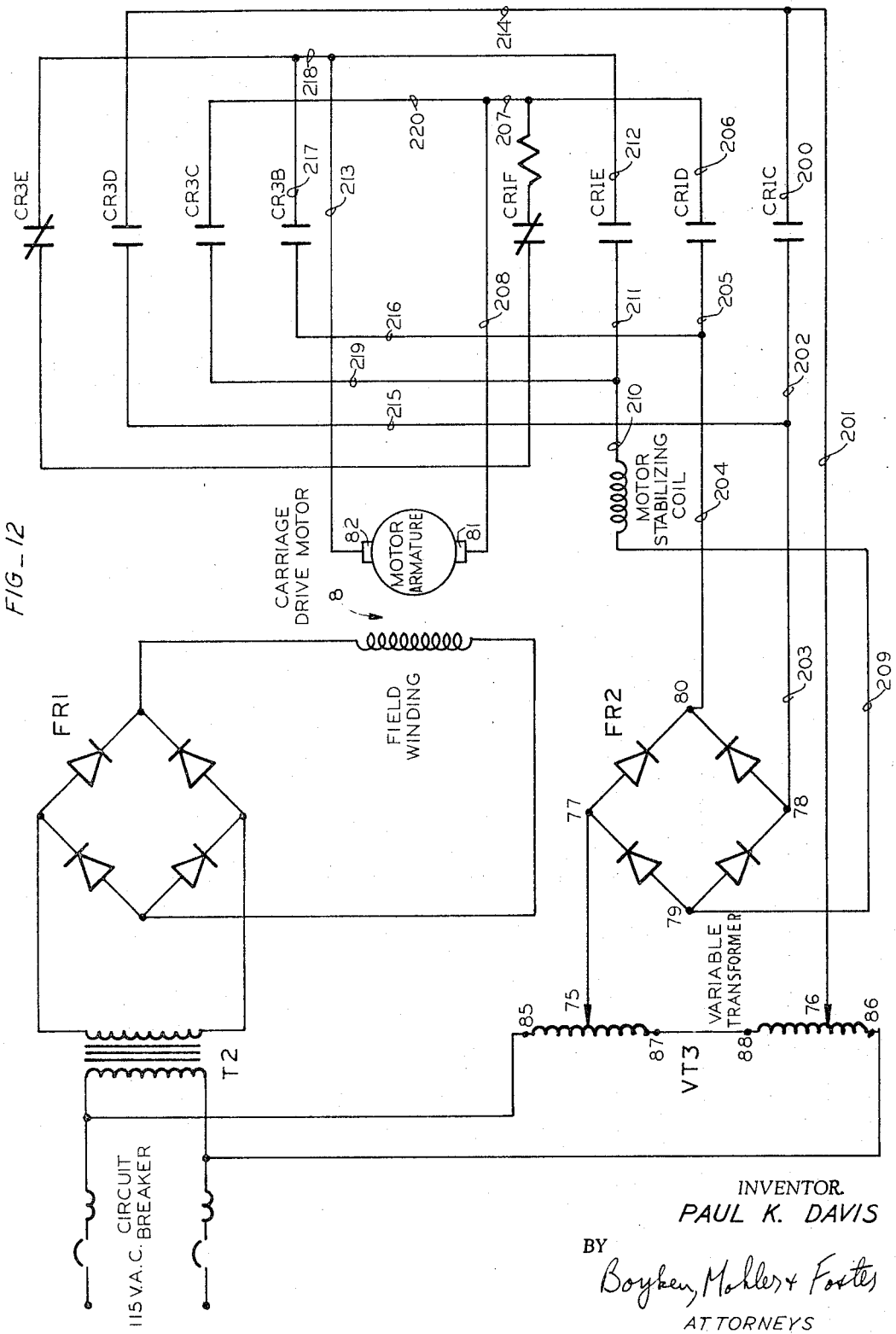

United States Patent Office 3,369,432
Patented Feb. 20, 1968

3,369,432
PIPE CUTOFF CONTROL APPARATUS
Paul K. Davis, Alameda, Calif., assignor, by mesne assignments, to First Western Bank and Trust Company, San Francisco, Calif., a banking corporation
Filed Aug. 16, 1965, Ser. No. 479,978
5 Claims. (Cl. 82—53.1)

ABSTRACT OF THE DISCLOSURE

In apparatus for cutting into discrete lengths sheet metal pipe continuously being discharged longitudinally of its axis from a forming machine, including a cutting means carried by a carriage driven axially at approximately the same speed as the pipe during each cutting cycle, a control system which senses axial displacement between the pipe and the cutting means, varies the speed of the carriage to maintain the displacement during the cutting cycle, and returns the cutting means to a neutral position on the carriage between cutting cycle.

---

This invention relates to pipe cutoff apparatus, and more particularly to a control system for apparatus of the type employed in cutting continuously formed sheet metal pipe into desired lengths as disclosed in copending application Serial No. 249,196, filed Jan. 3, 1963, now Patent No. 3,198,043.

Said copending application discloses apparatus for cutting pipe into successive lengths as it is continuously discharged from a pipe forming machine and is rotating about its longitudinal axis. Such apparatus comprises a carriage that travels independently of, and parallel to the longitudinal path of travel of said pipe and which supports for transverse movement into and out of cutting relation to said rotating pipe a cutting device. The carriage is intended to be driven at a rate of speed closely approximating that of the pipe so that the cutting device will cut in a plane normal to the pipe axis.

However, it has been found that nonuniformities in the pipe materials, deviations in dimensions of the formed pipe, and rotational speed variations inherent in the pipe driving means cause the rate of speed of pipe issuing from the forming machine to vary from a constant rate. As a consequence, the carriage with the cutting means must be correspondingly varied to match the speed of the pipe so that a uniform cut will result when the cutting means engages the pipe.

It is therefore an object of this invention to provide, in apparatus for cutting continuously formed sheet metal pipe into lengths as the pipe emerges from the pipe forming mechanism, means for maintaining the speed of the cutting means the same as the continuously emerging pipe.

Another object of this invention is to provide, in apparatus for cutting continuously moving elongated sheet metal pipe into lengths, means for indicating during the cutting operation the relative position of the cutting means in respect to the continuously moving pipe, and, in response, thereto, means for adjusting the longitudinal speed of the cutting means in order to maintain a fixed relative position of the same with the continuously moving pipe.

It is another object of this invention to provide improved control apparatus for coordinating, with a forming machine which is continuously forming sheet metal pipe, the operations of cutting means, including: 1, initiating the forward movement of the cutting means; 2, associating the cutting means in cutting relation with the pipe; 3, maintaining the longitudinal speed of the cutting means at the same speed as the continuously moving pipe during the cutting operation; 4, retracting the cutting means from said cutting relation; 5, reversing movement of the cutting means; and 6, stopping the cutting means at its initial rest position.

A further object of this invention is the provision of means for sensing the relative difference in speeds between a pipe continuously issuing from a pipe forming machine and a traveling cutting means and employing such difference to adjust the speed of the cutting means to match the pipe speed.

These and other objects and advantages of this invention will become apparent from the following description of one embodiment thereof taken in conjunction with the accompanying drawings, in which:

FIG. 1 is an isometric view of a portion of the pipe cutting apparatus and a schematic diagram of a part of the control circuit of an embodiment of the invention.

FIG. 2 is a top plan view of a portion of the apparatus of FIG. 1 showing the platform in its fixed position on the carriage.

FIG. 3 is a side elevational view of the apparatus as seen from line 3—3 of FIG. 2.

FIG. 4 is an enlarged top plan view of a portion of the apparatus of FIG. 2.

FIG. 5 is a sectional view of a portion of the apparatus as seen from line 5—5 of FIG. 2.

FIG. 6 is a top plan view of a portion of the apparatus similar to FIG. 2, but showing the platform in its released position on the carriage.

FIG. 7 is an enlarged top view of a portion of the apparatus of FIG. 6.

FIG. 8 is a top plan view of the portion of the apparatus similar to FIGS. 2, 6, but showing the platform in its released position on the carriage when the saw blade is engaged in cutting the pipe and the pipe is traveling at a greater rate of speed than the carriage.

FIG. 9 is an enlarged top view of a portion of the apparatus of FIG. 8.

FIG. 10 is a side elevational view, on a reduced scale, of the cutting and handling apparatus.

FIG. 11 is an isometric partly schematic view of the indicating means of the apparatus of FIG. 1.

FIG. 12 is the schematic diagram of another portion of the circuit which controls the carriage drive motor.

Generally, the present invention provides improved apparatus adapted to cooperate with a pipe forming machine of the type that discharges a continuous sheet metal pipe along a generally horizontal path of travel at the same time the pipe is rotating about its longitudinal axis.

The apparatus of this invention includes a cutting means carried on a carriage which moves along such path of travel with the discharging pipe for cutting the same into lengths. The cutting means is supported on a platform so mounted that it is free to "float" or move a limited amount independently of the carriage in either longitudinal direction parallel to the pipe axis during the cutting of the pipe.

This invention is particularly concerned with a control system for controlling the speed of the carriage to match the speed of the discharging pipe and includes sensing means, mounted on the platform and carriage, which senses a change in the relative position of the pipe with respect to the carriage. Means are provided for indicating such change and for adjusting the speed of travel of the carriage along the path during the cutting operation in accordance therewith. Thus, a uniform cut of a pipe is maintained by increasing or decreasing the speed of the carriage during the cutting operation when the indicating means shows a change in the relative position of the carriage and the pipe.

In detail, referring to the drawings, and more particularly to FIG. 1, there is shown a continuousely formed sheet metal pipe 10, moving in one direction, indicated by the arrow 9, along a path extending longitudinally of the pipe, and rotating about its longitudinal axis.

The cutting apparatus, indicated generally at 11, comprises a carriage 12 and a platform 13 supported on the carriage. The carriage 12 includes a base 14 which has mounted thereon two pairs of freely rotatable wheels 15 which are adapted to roll on a pair of generally triangularly shaped rails 16. The rails 16 extend in parallel relation to each other and to the path of movement of the pipe. The carriage 12 is moved along the rails 16 by means of a flexible chain 57 which has one end thereof securely connected to the front portion of the base 14 and the other end thereof connected to the carriage drive motor 8 (FIG. 10).

A generally rectangular frame 18 is mounted for tilting on carriage 12 by means of pivot pins 22 secured intermediate the ends of said frame and pivotally received in brackets 23 on base 14. Supported on one end of the frame 18 which shall hereinafter be referred to as the right-hand end (FIG. 1), is a motor 19 which drives a circular saw blade 20 by means of belt drive 21 connected to the saw shaft 26. Supported on the other end of frame 18, opposite pivot ends 22 frame motor 19, which shall hereinafter be referred to as the left-hand end, is a flat metal plate 24 on which is mounted the platform 13 carrying saw 20. Actuating means for tilting frame 18 thereby raising saw blade 20 into cutting engagement with the periphery of pipe 10 is a solenoid operated double acting hydraulic cylinder 25, connected between base 14 and plate 24. As blade 20 is raised by cylinder 25, motor 19 is lowered and vice versa.

FIG. 2 illustrates in greater detail the platform 13 of the pipe cutting apparatus 11. The platform 13 is supported on two longitudinally extending centering shafts 27 by means of four open-ended bearings 28. The centering shafts 27 are in turn supported at their opposite ends by close ended blocks 29 which are rigidly fixed to the plate 24. Bearings 28 are securely attached to the platform base 17 and permit the platform 13 to move a restricted distance in either longitudinal direction independently of the carriage 12.

Attached rigidly to the opposed faces of the two left-hand side bearings 28 and projecting outwardly from the left-hand side of platform base 17 in a direction normal to the movement of the carriage 12, which shall hereinafter be referred to as the transverse direction, are plates 30.

The saw shaft 26 is rotatably supported by two self-aligning bearings 31 which are mounted on platform base 17.

The bearing 31 at the pulley end of shaft 26 may be rigidly secured to base 17 whereas the bearing adjacent blade 20 is preferably transversely adjustable as by being bolted through slots in said base. A pair of opposed adjusting blocks 59 (FIG. 2) are secured to face 17 at opposite ends of bearing 31 adjacent blade 20 and carry adjusting bolts 60 threaded transversely therethrough. The inner ends of bolts 60 are in abutting relation with the opposite ends of said bearings so that, by tightening one of the bolts 60 and loosening the other, the saw shaft 26 may be aligned parallel to, and the plane of saw blade 20 perpendicular to, the longitudinal axis of the pipe 10 to be cut.

Platform 13 is also provided with a saw centering and locking mechanism, generally designated 35 (FIGS. 2, 4), which serves to hold said platform centered with respect to carriage 12 during non-cutting operation and releases it to float or travel with respect to carriage 12 when the saw is engaged with the pipe. Mechanism 35 is mounted on a base plate 36, rigidly secured to plate 24 between plates 30, and includes an electrically operated solenoid 40 having a projecting plunger 39. When the solenoid is energized, plunger 39 is retracted into the solenoid coil as shown in FIGS. 6, 7 and 9. The outer end of plunger 39 is connected to an eccentric ear of a double crank lever 37 by means of link 38 and pivot pin 45. Fastened to the end of link 38 opposite from plunger 39 is one end of an helical tension spring 46 which projects plunger 39 when the solenoid coil is deenergized (FIG. 2). The other end of spring 46 is attached to base plate 36 by a screw 47.

Lever 37 is pivoted to plate 36 by pin 58 and has its ends on opposite sides of pin 58 respectively connected to oppositely outwardly projecting stock buttons 42 by toggle links 41 and pivot pins 48 and 49 (FIGS. 4, 5). Buttons 42 are supported for reciprocating in bearings 43 and are retracted and projected oppositely inwardly and outwardly of the ends of plates 36 by said lever and toggle links. A stop 50 is fixed to the base plate 36 adjacent lever 37 for preventing it from rotating in the clockwise direction (FIG. 4) past the straight line position of links 41 in which buttons 42 are fully projected. Rotation of lever 37 in a counterclockwise direction (FIG. 9) by retraction of plunger 39 causes retraction of buttons 42.

In the fully projected position, the distance between the outer ends of buttons 42 is substantially the same as the spacing between plates 30 and the former thereby abut the latter (FIGS. 2, 4), preventing longitudinal relative movement of the platform 13 with respect to the carriage 12.

The sides of plates 30 opposite buttons 42 are each in engagement with one end of a helical compression spring 51, the other end of which is secured to the upstanding leg 54 of an angle bracket 55 by bolts 53 and nut 56. The other legs of brackets 55 are secured to plate 24 adjacent bearings 28. In this manner, springs 51 exert opposing forces on platform 13 through plates 30 and serve as yieldable means for centering or returning platform 13 to a neutral position with respect to carriage 12 when buttons 42 are retracted (FIG. 6).

As previously indicated, buttons 42 are retracted (FIGS. 6, 7, 9) by energization of solenoid 40 which retracts plunger 39, thereby rotating crank 37 through connecting link 38. Said rotation causes toggle links 41 to pull buttons 42 oppositely inwardly of the ends of base plate 36 of the saw centering mechanism and out of engagement with plates 30. This permits platform 13 to move longitudinally on centering shafts 27 independently of carriage 12 under the influence of disturbing forces applied thereto and against the urgency of springs 51 (FIGS. 8, 9). Upon removal of outside forces from platform 13, springs 51 urge said platform to a centered or neutral position with plates 30 equally spaced from the outer ends of buttons 42 (FIGS. 6, 7). Deenergization of solenoid 40 permits spring 46 to withdraw plunger 39 and the reverse rotation of crank 37 accomplished thereby projects buttons 42 into engagement with plates 30 (FIGS. 2, 4) to lock platform 13 in its centered or neutral position.

During a cutting operation the rate of speed at which forward movement of carriage 12 is initiated is matched as closely as possible to the speed of pipe 10 issuing from the pipe forming machine. For various reasons, including varying thickness or hardness of the strip from which the pipe is formed, varying surface texture and slippage in the forming process, the pipe speed may vary from time to time.

When the circular saw blade 20 is engaged in cutting the pipe 10 and if the longitudinal forward rate of speed of the pipe 10 becomes greater than the longitudinal forward rate of speed of the carriage 12, pipe 10 tends to drag the circular saw blade 20, and thus the platform 13 to which it is attached, forwardly along centering shafts 27. FIGS. 8 and 9 show the position of the platform 13 in relation to carriage 12 when the saw centering mechanism 35 has released the platform 13 from its locked position on carriage 12 and platform 13 has thus been caused to move forwardly (in the direction of arrow 9, FIG. 1) relative to carriage 12.

Rigidly supported on platform base 17 and extending transversely and outwardly from the right-hand side of platform 13 is an elongated arm 32 (FIGS. 1, 2), which forms one element of the sensing means, generally indicated at 44. The outer end of indicating arm 32 carries a longitudinally extending rack 33 which is in mesh with the pinion 34 (FIG. 2) of means 44.

As shown in FIG. 8, the indicating arm 32 and rack 33, which are rigidly fixed to platform 13, also move forwardly relative to carriage 12 and cause pinion 34 to rotate in a clockwise direction. If, on the other hand, the longitudinal rate of speed of the platform 13 is slower than the longitudinal rate of speed of the carriage 12, the pipe 10 tends to drag the circular saw blade 20 and the platform 13 rearwardly along centering shaft 27. This movement results in indicating arm 32 and rack 33 moving rearwardly relative to carriage 12 and cause pinion 34 to rotate in a counterclockwise direction.

As illustrated in FIG. 11, the pinion gear 34 is operatively connected to electrically conductive wiper 65, which is supported for sliding along transformer coil 66. The pinion 34 is secured to the upward end of a rotatably mounted vertical shaft 61 on the lower end of which is secured a pinion gear 62 in mesh with a lower rack 63. A transversely projecting arm 64 secured to the opposite side of rack 63 carries wiper 65 in electrical contact with the turns of transformer 66. When pinion 34 is rotated, wiper 65 sweeps longitudinally across coil 66 a distance proportional to the longitudinal movement of the platform 13 relative to the carriage 12.

Referring to FIG. 1 it is seen that one end of transformer coil 66 is connected by wires 125 and 126 to terminal 83 of the saw blade position indicator. Terminal 84 of said indicator is connected by wire 127 to the wiper 65. The other end of the potentiometer coil 66 is connected to terminal 83 of the saw blade position indicator by the following electrical components: wires 128 and 118; secondary of transformer T1; fuse; wires 100, 129 and 126. The saw blade position indicator is a typical voltage measuring device and as situated in the aforesaid circuit measures the voltage between wiper 65 and the end of transformer coil 66 which is connected to wire 128. Thus, when wiper 65 is in electrical contact with the end of transformer coil 66 which is connected to wire 125, the saw blade position indicator shows maximum voltage. When wiper 65, on the other hand, is in electrical contact with the end of transformer coil 66 which is connected to wire 128, the saw blade position indicator shows minimum voltage.

When the longitudinal rate of speed of pipe 10 is greater than carriage 12, pinion 34 rotates in a clockwise direction and lower rack 63 and wiper 65 thereof move in a longitudinally rearward direction. As wiper 65 moves in a direction toward the end of transformer coil 66 which is connected to wire 128, the voltage indicated by the saw blade position indicator decreases. Thus, the greater the relative speed of the pipe 10 with respect to the carriage 12, the smaller the indicated voltage on the saw blade position indicator. Likewise, the greater the relative speed of the carriage 12 with respect to the pipe 10, the greater the indicated voltage on the saw blade position indicator.

The operation of the pipe cutting apparatus is controlled by a circuit including microswitches which are tripped by either the continuously formed pipe 10 (see FIG. 1) or a dog 67 which is mounted on and projects outwardly of base 14 of carriage 12. A plurality of microswitches L7A, L7B, and L7C are supported at various points in the path of pipe 10 to be engaged by the free end thereof for determining the length of pipe to be cut. These switches are connected in a circuit with length selector switch 70 and drive motor 8 (see FIG. 10) which causes the carriage 12 to be moved forwardly when the selected one of switches L7A, L7B, or L7C is closed.

Also included in said circuit are a plurality of microswitches L2, L6, L5, and L3, supported in various locations along the path of travel of carriage 12 to be selectively engaged by dog 67. Microswitch L6, when tripped by dog 67 causes the energization of two solenoids: the solenoid which controls cylinder 25 to raise saw blade 20 into cutting engagement with pipe 10, and saw centering solenoid 40, which releases the platform 13 from its locked condition with repsect to carriage 12. When microswitch L5 is tripped by dog 67, the solenoid controlling cylinder 25 and the solenoid 40 are deenergized whereby the saw blade 20 is retracted from its cutting position by said cylinder and the platform 13 is recentered and locked with respect to the carriage 12. The tripping of microswitch L3 by dog 67 causes reversal of the carriage drive motor 8 thereby moving the carriage 12 rearwardly toward its initial start position. When microswitch L2 is tripped on such return movement by dog 67 the carriage drive motor is deenergized and the carriage 18 stops at its start position.

For convenience, the electrical circuit has been divided into the two portions shown in FIGS. 1 and 12, both of which are provided with 115 volts A.C. input from a conventional line source. The circuit shown in FIG. 1 will be referred to as the "control" circuit and the circuit shown in FIG. 12 will be referred to as the "carriage drive motor" circuit. The input to the portion of the circuit shown in FIG. 1 is stepped down by a transformer T1, and such portion of the circuit includes the aforementioned microswitches and the coils of the control relays which close and open their respective associated contacts is providing the functions described above. The relay coils are designated CR1, CR2, CR3, and TD1, the latter denoting a "time delay" relay and their associated contacts bear the same identification including a letter subscript. For example, relay contacts CR1A are closed upon energization of relay coil CR1 (FIG. 1).

The variable speed drive motor 8 (FIG. 12) may be of the compound, shunt-stabilized, direct current type and the input to the field winding thereof may be stepped down by a transformer T2 and converted to D.C. by a conventional full-wave rectifier circuit FR1. A variable transformer VT3 and a conventional full-wave rectifier circuit FR2 are employed in the circuit of FIG. 12 to step down and convert the A.C. input to D.C. for energization of the armature winding and stabilizing coil of carriage drive motor 8.

It is seen that in FIG. 1 one contact on each of the L7 microswitches is connected to a different position on the length selector switch 70. The position of the switch arm determines which one of the L7 microswitches energizes the carriage drive motor (e.g., switch L7A in FIG. 1). The arm of the length selector switch is connected by wire 105 to the automatic position of a control switch 71. The control switch has three positions: automatic, off and manual. When the arm of the control switch is in the off position, the carriage drive motor cannot be energized. When the arm of the control switch is placed in the manual position, the carriage drive motor is directly energized.

The electrical components making up that part of the "control" circuit which is closed upon the tripping of microswitch L7A, commencing with the arm of control switch 71 and terminating at the automatic position of said control switch, are as follows: wire 104; normally closed contacts of microswitch L3; wires 103, 102, 101 and 100; fuse; secondary of transformer T1; wires 108, 122 and 107; relay coil CR1; normally closed relay contacts CR3A; wire 106; normally open contacts of microswitch L7A; arm of length selector switch 70; and wire 105.

In operation, the tripping of microswitch L7A by the free outer end of continuously moving pipe 10 or the movement of the arm of control switch 71 to the "manual" position completes the aforesaid circuit causing the energization of relay coil CR1, which in turn closes normally open relay contacts CR1A, CR1C, CR1D and CR1E (FIG. 12) and opens normally closed relay contacts CR1B and CR1F. The closing of relay contacts CR1A, which shunts microswitch L7A, prevents the interruption of the automatic sequence of operation should microswitch L7A be released from its tripped position.

The electircal components making up that part of the "carriage drive motor" circuit (see FIG. 12) which is completed upon the tripping of microswitch L7A, commencing with terminal 80 of full wave rectifier FR2 and terminating with terminal 79 of said rectifier, are as follows: wires 204 and 205; normally open relay contacts CR1D; wires 206, 207 and 208; motor armature; wires 213 and 212; normally open relay contact CR1E; wires 211 and 210; motor stabilizing coil; and wire 209. Terminals 77 and 78 are connected to wiper arms 75 and 76, respectively, of variable transformer VT3, which, in turn, is connected to 115 v. A.C. supply. While terminal 77 is connected directly to wiper arm 75, terminal 78 is connected to wiper arm 76 via wires 203 and 202, normally open relay contacts CR1C and wires 200 and 201. The motor armature is energized upon the closing of normally open relay contacts CR1C, CR1D, CR1E and the opening of normally closed relay contacts CR1F, which, as previously stated, occurs upon the energization of relay coil CR1. Upon energization of the motor armature, carriage drive motor 8 starts the movement of carriage 14 in a forwardly direction with the pipe.

As the carriage travels forwardly, dog 67 (FIG. 1) trips microswitch L6 causing energization of solenoid controlled cylinder 25 and solenoid 40. The electrical components making up that part of the "control" circuit which is completed upon the tripping of microswitch L6, commencing with one contact of microswitch L6 and terminating at the other contact of said microswitch, are as follows: wires 109 and 110; relays CR2 and TD1; wire 108; secondary of transformer T1; fuse; wires 100, 101, 102 and 111; normally closed contacts of microswitch L2; wires 112 and 113; normally closed contacts of microswitch L5; and wires 114, 115 and 116. The relay TD1 is a time delay relay wherein there is a built in time delay between energization of its coil and the opening or closing thereof of its contacts.

The completion of said circuit as a result of the tripping of microswitch L6 causes the energization of relay coils CR2 and TD1 wherein normally open relay contacts CR2A and CR2B close immediately and normally open contact TD1A close after a preset period of time, respectively. The closing of contacts CR2A completes its electrical circuit thereby energizing the solenoid controlling cylinder 25. The electrical components which comprise this portion of the "control" circuit, commencing with one terminal of the solenoid controlling cylinder 25 and terminating at the other terminal of said solenoid, or as follows: wires 117, 122 and 108; secondary of transformer T1; fuse; wires 100, 101, 102 and 111; normally closed contacts of microswitch L2; wire 112; normally open relay contacts CR2A; and wire 130. When relay contacts CR2 are closed the solenoid controlling cylinder 25 is energized and the sawblade 20 is moved into cutting engagement with pipe 10.

The closing of contacts TD1A completes the electrical circuit wherein saw centering solenoid 40 is energized. The electrical components which comprise this portion of the "control" circuit, commencing with one terminal of solenoid 40 and terminating at the other terminal of said solenoid, are: wires 119 and 118; secondary transformer T1; fuse; wires 100, 101 and 131; normally open relay contacts TD1A; and wire 132. Thus, when relay contacts TD1A are closed, saw centering solenoid 40 is energized and platform 13 is unlocked and free to move a restricted distance with respect to carriage 12. Relay contacts CR2B, connected across microswitch L6 by means of wires 109 and 116, shunt said microswitch upon the energization of relay coil CR2, thus preventing deenergization of the circuits to the solenoids after dog 67 has passed microswitch L6.

After travel of carriage 12 through a distance sufficient for blade 20 to cut completely around the periphery of pipe 10 (at least one revolution of the pipe), microswitch L5 is tripped by dog 67. Because said microswitch is in series with the power circuit to relay coils CR2 and TD1, opening of the normally closed microswitch L5 breaks such circuit causing the deenergization of relay coils CR2 and TD1. The deenergization of relay coil CR2 opens contacts CR2A and CR2B, which in turn deenergize the solenoid to cylinder 25. The deenergization of relay coil TD1 opens contacts TD1A which cause the deenergization of saw centering solenoid 40.

Thereafter, dog 67 on forwardly moving carriage 12 trips microswitch L3 causing the carriage drive motor to reverse its direction of rotation and drive the carriage 12 in a rearwardly direction. Micoswitch L3 has two pairs of contacts, one pair normally closed and in series with relay coil CR1 and a normally open pair. When microswitch L3 is tripped, its normally closed contacts are opened and the circuit to relay coil CR1 is broken opening contacts CR1C, CR1D and CR1E (FIG. 12) thereby causing the deenergization of the armature winding of the carriage drive motor. Likewise, contacts CR1D and CR1F are returned to their normally closed positions.

The tripping of microswitch L3 closes its pair of normally open contacts (FIG. 1). The electrical components making up that part of the "control" circuit which is completed upon the closing of the normally open contacts of microswitch L3, commencing with one contact of said normally open pair and terminating at the other contact of said normally open pair, are as follows: wires 124, 103, 102, 101 and 100; fuse; secondary of transformer T1; wires 108, 122 and 121; relay coil CR3; normally closed relay contacts CR1B; and wire 120. Upon the completion of this circuit as a result of the tripping of microswitch L3, the relay coil CR3 is energized causing normally closed contacts CR3A and CR3E (FIG. 12) to open and normally open contacts CR3B, CR3C, CR3D and CR3F (FIGS. 1 and 12) to close, thereby causing the energization of carriage drive motor 8.

The electrical components making up that part of the "carriage drive motor" circuit which is completed upon the energization of relay coil CR3, commencing with terminal 80 of full wave rectifier FR2 and terminating with terminal 79 of said rectifier, are as follows: wires 204 and 216; relay contacts CR3B; wires 217, 218 and 213; motor armature; wires 208 and 220; relay contacts CR3C; wires 219 and 210; motor stabilizing coil; wire 209. The terminal 78 of full wave rectifier FR2 is connected to wiper arm 76 by the following electrical components upon the energization of relay coil CR3: wires 203 and 215; relay contacts CR3D; wires 214 and 201. In the instant case of the tripping of microswitch L3 and the resulting energization of relay coil CR3 the terminal 80 (FIG. 12) of the full wave rectifier FR2 is connected to terminal 82 of the motor armature, while in the case of the tripping of microswitch L7A, as previously described, terminal 80 of said rectifier is connected to terminal 81 of the motor armature. The change in the connection of terminal 80 to the motor armature results in a change in the direction of flow of direct current through the motor armature. The flow of current from terminal 82 to terminal 81 causes the rotation of the armature in a direction opposite to that when microswitch L7A is tripped, thereby causing the carriage 12 to be moved in a rearwardly direction.

Relay contacts CR3F (FIG. 1) are connected across the open contacts of microswitch L3 as follows, commencing with one contact of CR3F and terminating with the other contact of CR3F: wire 114; normally closed contacts of microswitch L5; wires 113 and 112; normally closed contacts of microswitch L2; wires 111, 103 and 124; normally open contacts of microswitch L3; and wire 120. When relay coil CR3 is energized by the tripping of microswitch L3, contacts CR3F are closed shunting the open contacts of microswitch L3 thereby preventing deenergization of the circuit of relay coil CR3 after dog 67 has passed microswitch L3.

Thereafter, carriage 12 travels in a rearwardly direction through a distance sufficient to bring it almost to its initial start position, whereupon microswitch L2 is tripped by dog 67. The tripping of microswitch L2 causes the deenergization of the armature winding and the stopping of carriage 12 at its initial start position. The deenergization of the motor armature as a result of the tripping of microswitch L2 results from the fact that relay coil CR3 is in series with the normally closed contacts of microswitch L2. When the normally closed contacts of microswitch L2 are open due to the tripping of microswitch L2 the circuit of relay coil CR3 is broken thereby causing the deenergization of relay coil CR3 wherein relay contacts CR3A and CR3E (FIG. 12) close and relay contacts CR3B, CR3C, CR3D and CR3F open. This breaks the circuit that energizes the armature winding of the carriage drive motor.

Referring to FIG. 12 and variable transformers VT3, the magnitude of the voltage which energizes the motor armature is a function of the voltage between wiper 75 and wiper 76. Thus, when wiper arm 75 is moved toward terminal 85 or when wiper 76 is moved toward terminal 86, the voltage applied to the motor armature increases thereby causing an increase in the number of revolutions per minute of the rotor of the carriage drive motor. This in turn results in the carriage 12 traveling at a greater longitudinal rate of speed than before. Correspondingly, when wiper 75 is moved toward terminal 87 or when wiper 76 is moved toward terminal 88 the armature voltage decreases thereby causing a decrease in the number of revolutions per minute of the rotor of the carriage driven motor. As a result the carriage 12 travels at a reduced longitudinal rate of speed than before.

In operation at the beginning of a cycle, the pipe 10 leaves the forming machine (not shown) traveling in a path extending along its longitudinal axis and is received on support 89 (FIG. 10) of the pipe cutoff apparatus 11. At this time the cutoff apparatus 11 is adjacent to the forming machine (FIG. 10 shows the pipe cutoff apparatus 11 at the furthest point on rails 16 away from the forming machine) and the runout tables 90 are in their normal, rest position (substantially as shown in FIG. 10).

At a certain position along its path of travel the front end of forwardly traveling pipe 10 trips successively microswitches L7A, L7B and L7C. The tripping of microswitch L7A initiates the forward movement of the pipe cutoff apparatus 11. Thereafter, dog 67 on the forwardly moving carriage 12 trips microswitch L6 thereby energizing the solenoid controlling cylinder 25 and saw centering solenoid 40; cylinder 25 raises saw blade 20 into cutting engagement with the pipe 10 and the saw centering solenoid 40 releases platform 13 from its fixed position on carriage 12. The severing of pipe 10 is accomplished by the rotation of the periphery of pipe 10 about its axis into blade 20. However, if during the cutting operation there is a decrease in voltage as indicated on the saw blade position indicator, the operator will know that the pipe 10 is traveling at a greater longitudinal rate of speed than the carriage 12. To increase the speed of carriage 12 he will move wiper 75 toward terminal 85 (FIG. 12) or move wiper 76 toward terminal 86 until the needle in the saw blade position indicator is in the position indicating that pipe 10 is traveling at the same longitudinal rate of speed as carriage 12. If, however, there is an increase in voltage as indicated by the saw blade position indicator, the operator will know that the carriage 12 is traveling at a greater longitudinal rate of speed than the pipe 10. To decrease the speed of carriage 12 he will move wiper 75 toward terminal 87 or move wiper 76 toward terminal 88 until the needle in the saw blade position indicator is in the position indicating no relative movement of the pipe 10 with respect to the carriage 12.

After the cut of pipe 10 has been completed, the dog 67 on forwardly moving carriage 12 trips microswitch L5 thereby deenergizing the solenoid controlling cylinder 25 and the saw centering solenoid 40; the cylinder 25 retracts saw blade 20 from its cutting position and the saw centering solenoid 40 returns the platform 13 to its fixed centered position on carriage 12.

As saw blade 20 is lowered and clears the pipe 10, carriage 12 is approaching the forward position of its travel (FIG. 10) whereupon dog 67 trips microswitch L3 thereby reversing the direction of travel of carriage 12. Carriage 12 is now moving opposite to the movement of pipe 10 which is still being fed at the same rate of speed from the forming machine. The run out tables 90 (FIG. 10) serve to carry the cut length of pipe away from the forming machine so that a gap is created between the trailing end of the severed pipe length and the leading end of the succeeding pipe issuing from the forming machine. As the rearwardly traveling carriage 12 approaches the forming machine dog 67 trips microswitch L2 which shuts off the power to the carriage drive motor thereby bringing the carriage to rest at its initial start position.

Although this invention has been described in detail, such is not to be taken as restrictive thereof, as modifications that would appear to those skilled in the art will be understood within the spirit and scope of the invention. One such contemplated modification is the elimination of the operator for adjusting the longitudinal rate of speed of carriage 12 during the cutting operation. Instead of an operator it is contemplated that by means of a conventional servo mechanism, the longitudinal rate of speed of carriage 12 may be adjusted to correspond to the speed of pipe 10 whenever there was a change in the relative position of the carriage 12 with respect to the pipe 10.

It will also be understood that various cutting means other than a saw blade may be employed to sever the pipe lengths. For example, a cutting torch or the like may be carried by the carriage 12 and the pipe speed sensed by a rigid bar mounted on platform 13 to engage the cut end of the pipe.

I claim:
1. In apparatus for cutting pipe continuously moving in one direction along a path extending longitudinally of its axis and rotating about said axis, including
   (a) cutting means;
   (b) carriage means carrying said cutting means and supported for movement in said one direction parallel to said path; and
   (c) variable speed drive means connected to said carriage means for so moving the same at approximately the same speed as said pipe along said path;
a control system comprising:
   (d) sensing means carried by said carriage means and associated with said pipe for sensing longitudinal displacement between corresponding points on said carriage means and said pipe caused by a difference in speed therebetween; and,
   (e) means responsive to said displacement sensed by said sensing means for adjusting the speed of said drive means sufficient to maintain said displacement.
2. The apparatus of claim 1, including:
   (f) means for moving said cutting means into engagement with said pipe; and,
   (g) said sensing means including means engaging said pipe during engagement by said cutting means.
3. In apparatus for cutting pipe continuously moving in one direction along a path extending longitudinally of its axis and rotating about said axis, including
   (a) a carriage supported for movement parallel to said path;
   (b) variable speed driving means connected to said carriage for so moving the same in said one direc- tion at approximately the speed of said pipe along said path;

(c) cutting means carried by said carriage and supported for transverse movement into and out of cutting relation with said pipe; and (d) means for so moving said cutting means;

a control system, comprising:

(e) a platform mounting said cutting means on said carriage and displaceable longitudinally of said path with respect to said carriage;

(f) means carried by said platform and engageable with said pipe for moving said platform at the same speed as said pipe;

(g) sensing means associated with said carriage and said platform for sensing displacement of said carriage and said platform caused by a difference in speed therebetween; and (h) control means associated with said driving means for adjusting the speed thereof sufficient to maintain said displacement.

4. The apparatus of claim 3, including:

(i) yieldable means associated with said platform and said carriage for returning said platform to a neutral position on said carriage when said cutting means is out of cutting relation with said pipe.

5. The apparatus of claim 4, including:

(j) means for locking said platform in said neutral position.

References Cited

UNITED STATES PATENTS

| | | | |
|---|---|---|---|
| 3,085,481 | 4/1963 | Geist | 82—53.1 X |
| 3,158,074 | 11/1964 | Brigham | 82—53.1 X |
| 3,198,043 | 8/1965 | Davis | 82—53.1 |

HARRISON L. HINSON, *Primary Examiner.*